April 21, 1953    I. F. STEWART ET AL    2,635,261
FEEDER FOR ELONGATED CYLINDERLIKE OBJECTS
Filed April 25, 1949    3 Sheets-Sheet 1
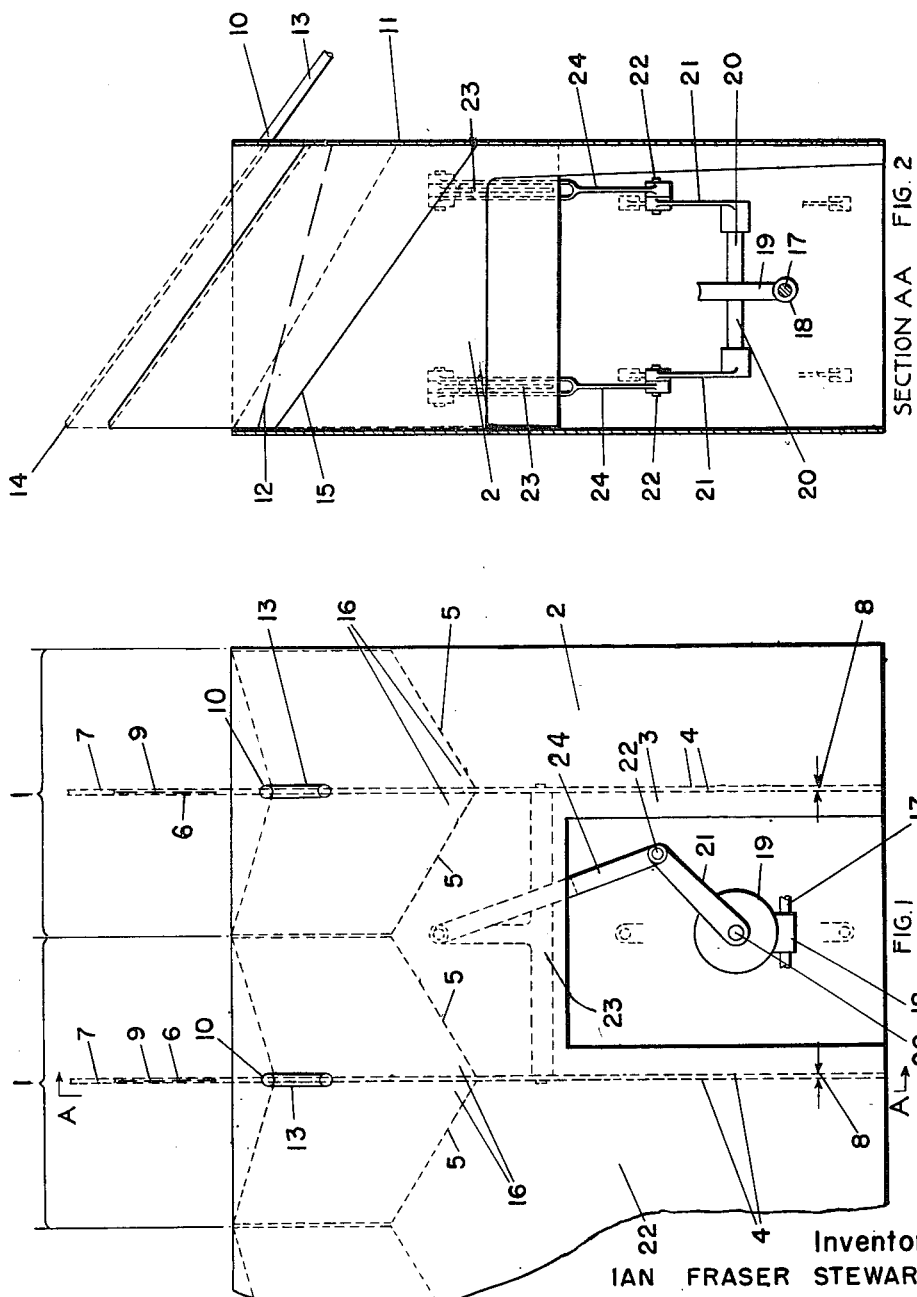
Inventors
IAN FRASER STEWART
DONALD GEORGE ASHCROFT
Cushman, Darby & Cushman
Attorneys

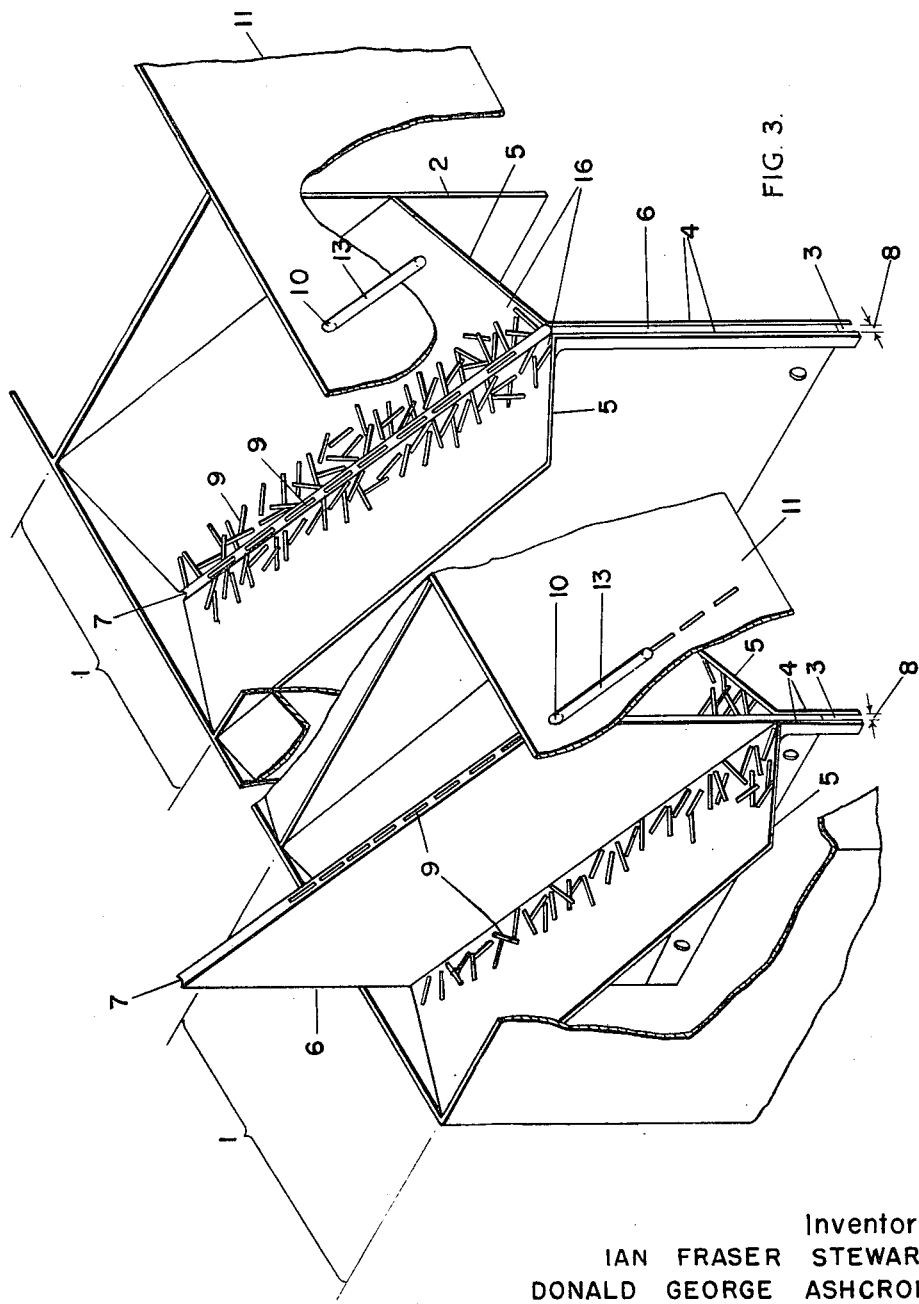

April 21, 1953     I. F. STEWART ET AL     2,635,261
FEEDER FOR ELONGATED CYLINDERLIKE OBJECTS
Filed April 25, 1949     3 Sheets—Sheet 3
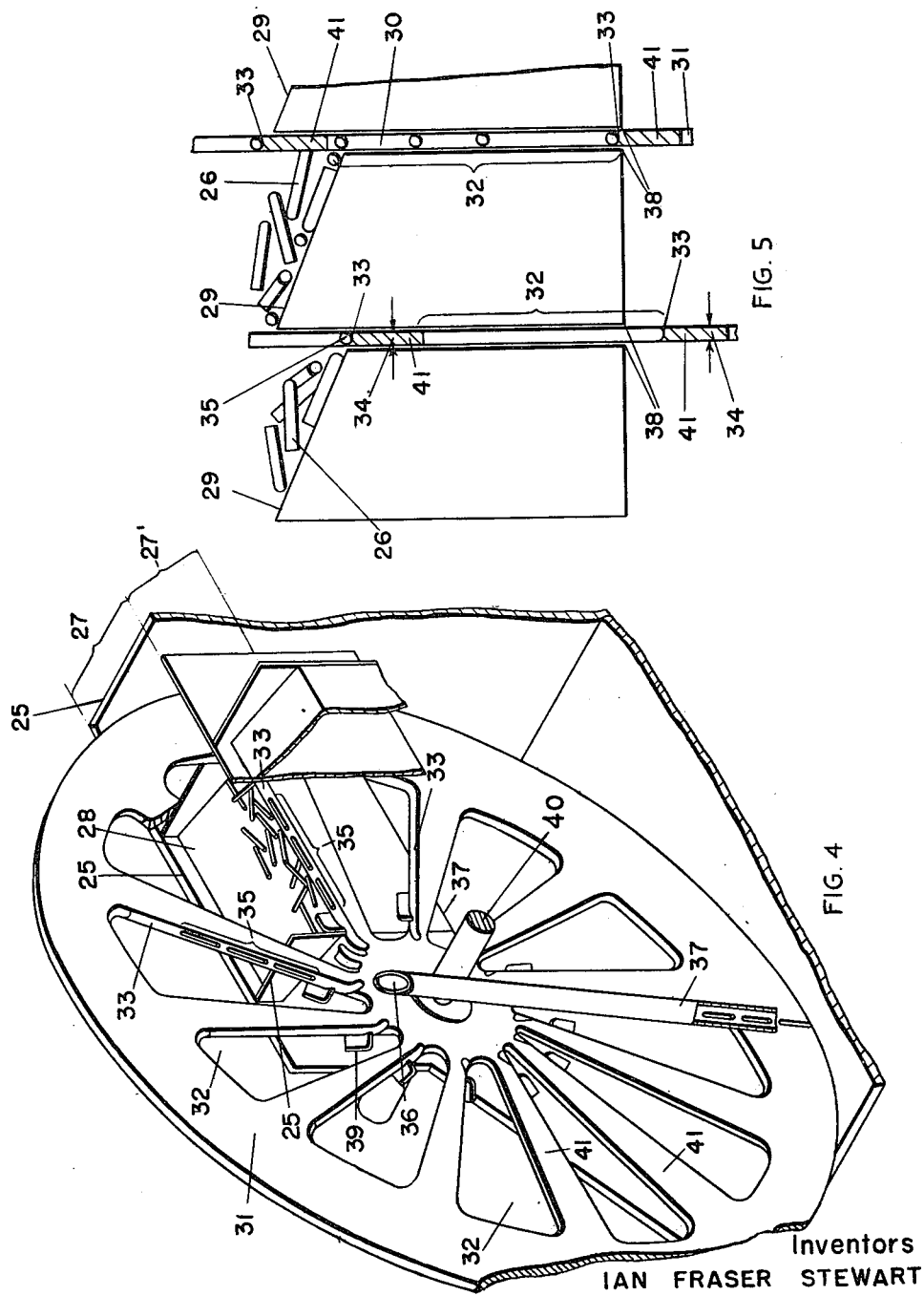
Inventors
IAN FRASER STEWART
DONALD GEORGE ASHCROFT
Attorneys

UNITED STATES PATENT OFFICE 2,635,261

FEEDER FOR ELONGATED CYLINDERLIKE OBJECTS

Ian F. Stewart, Kilwinning, and Donald G. Ashcroft, Saltcoats, Scotland, assignors to Imperial Chemical Industries Limited, a corporation of Great Britain Application April 25, 1949, Serial No. 89,456
In Great Britain May 3, 1948

2 Claims. (Cl. 10—162)

The present invention relates to a feeder for elongated cylinder-like objects, as for example tubes, cylindrical rods, and articles of other cross-sectional form as well as articles the cross-section of which varies along their length.

The object of the present invention is to provide a machine of the aforesaid kind particularly adapted for delivering articles of relatively greater length than width and of substantially straight longitudinal axis one behind the other in the direction of their longitudinal axis.

According to the present invention the machine particularly adapted for delivering articles of relatively greater length than width and of substantially straight longitudinal axis one behind the other in the direction of their longitudinal axis consists of a casing for receiving therein a bulk supply of said articles, said casing consisting of at least one unit, each unit comprising at least one lower terminal narrow elongated opening which is closed by a moving member provided with at least one groove of a width to permit only one row of said articles to lie therein, the groove in one position being at an angle to cause the articles collected therein to discharge into an orifice in a predetermined position independent of said groove.

In accordance with one embodiment of the invention a machine particularly adapted for delivering articles of relatively greater length than width and of substantially straight longitudinal axis one behind the other in the direction of their longitudinal axis consists of a casing for receiving therein a bulk supply of said articles to a depth not exceeding a predetermined level, said casing consisting of at least one unit, each unit comprising at least one base portion having a slot flanked on each side thereof by a vertical wall, the said walls being parallel to one another, extending vertically upwards to meet a surface which slopes downwards towards said slot and a blade of thickness approaching the width of the slot and having a groove along its upper edge and adapted to move vertically up and down through said slot, said groove being of a width to permit only one row of said articles to lie therein, and said unit having at least one discharge opening positioned in a wall thereof above said predetermined level and in alignment with the said groove for a position of said blade above said predetermined level, the groove in this position being at an angle to cause the articles collected therein to discharge through said opening.

In accordance with this embodiment of the invention the machine depends upon the action of a thin grooved blade held vertically with a groove on its upper edge at any suitable angle which may be fixed or variable but is always subject to mechanical control. The blade is movable in a vertical direction so that its grooved top is permitted to be submerged in a mass of articles of the kind defined delivered into the hopper of the machine. The blade is then allowed to rise through the mass of articles to permit the groove to catch some of the articles in its depression. When the grooved top is above the mass of articles the articles collected in the depression are allowed to pass into, for example, a collector pipe by arranging the grooved edge to have the required inclination in this position. The articles collected in the depression are caused to slide down the groove and into the pipe which is appropriately placed to catch the flow of articles. After the articles have been thus delivered, the blade returns to its lowest position beneath the mass of articles and the cycle of operations is repeated. In accordance with this embodiment the vertically held blade or plate may either be a vertically reciprocating blade or plate or a swinging blade or plate.

The reciprocating blade in a machine constructed in accordance with this embodiment picks up the articles of the kind defined by vertical thrust through a random heap of said articles. The reciprocating blade then retracts through the articles to the bottom dead centre to be able to repeat the thrust. At said bottom dead centre the relatively deep groove formed by the sloping walls and the groove of the blade helps to line up the articles for their more efficient lifting.

In accordance with another embodiment of the invention a machine particularly adapted for delivering articles of relatively greater length than width and of substantially straight longitudinal axis one behind the other in the direction of their longitudinal axis consists of a casing for receiving therein a bulk supply of said articles, said casing consisting of at least one unit, each unit comprising a top receiving portion the floor of which slopes from one side downwards to meet a vertical wall, a lower terminal narrow elongated opening below a vertical slot formed by said wall and another vertical wall, and a circular disc adapted to rotate in a vertical plane so that a rising portion thereof is constrained to move in said slot and to occupy substantially the full width of its gap, said slot extending vertically downwards to such a depth that its lower terminal gap is always closed by a portion of the disc, said circular disc having at least one groove contained between planes at right angles to the side of the disc, and said groove being of a width to permit only one row of said articles to lie therein and being so positioned to be in one position during the rotation of the disc at an angle to cause the articles collected therein to discharge eventually into an orifice in a predetermined position independent of said groove.

In accordance with this second embodiment of the invention the machine may take the form of a wheel with grooved strips positioned on one or both of its sides. On the other hand the wheel may take the form of a disc having apertures cut out therein and with grooves on the advancing face of each of these apertures. In this embodiment the wheel may be given a steady rotating motion. In contradistinction to the reciprocating blade embodiment which has a waste period during its retraction all the movement of the rotating disc may be utilised for the picking up of the articles. Furthermore, in accordance with this second embodiment of the invention the groove or grooves provided in the rotating disc or wheel pick up articles which have been already lined up. This lining up is due to the tubes dropping into the space between the adjacent floor walls when the top of this space is opened by the upward passage of the preceding spoke of the apertured disc or wheel. This pre-lining up of the articles is a fundamental action of the machine constructed in accordance with the second embodiment. The pre-lining also tends to permit more articles to be discharged in a given time. Again, the entire cycle of operations, i. e. from one pick up by a spoke to the pick up by the next spoke in the apertured wheel, is used to carry out useful work as there is no retraction. Furthermore, as the wheel is always rising through the mass of articles they tend to be more gently handled. Also the efficiency of operation is undiminished as the hopper floor is cleared. A machine constructed in accordance with the second embodiment may also be of smaller design than one constructed in accordance with the first embodiment. On the other hand, the smaller holding capacity of the second embodiment relative to that of the first embodiment, makes it necessary to keep it filled by the provision of a bucket conveyor or other filling means.

The invention is illustrated by way of example with reference to the diagrammatic drawings accompanying the specification whereof Figs. 1, 2 and 3 illustrate one embodiment of the invention and Figs. 4 and 5 illustrate another embodiment of the invention. Fig. 1 is a front elevation of a machine according to the first embodiment of the invention and particularly suitable for the delivery of detonater tubes and Fig. 2 is a side elevation of part of the machine on the line A—A of Fig. 1 looking in the direction of the arrow. Fig. 3 is an isometric view of the two units 1 in Fig. 1. Fig. 4 is an isometric view of a machine according to the second embodiment of the invention and particularly suitable for the delivery of detonator tubes and Fig. 5 is a front sectional view of the two units of the casing illustrated in Fig. 4. The same reference numerals refer to like parts throughout.

Referring to the drawings, Figs. 1, 2 and 3, 1 is a unit in the casing of the machine, two such units being shown. Each unit 1 comprises at least one base portion 2 each having a slot 3, flanked on each side thereof by a vertical wall 4, these side walls being parallel to one another and extending vertically upwards to meet a surface 5 which slopes downwards towards said slot 3, and a plate 6 of a thickness approaching the width 8 of the slot 3 and having a groove 7 along its upper edge and adapted to move up and down through said slot 3 said groove 7 being of a width to permit only one row of tubes 9 to lie therein. Each unit 1 has a discharge opening 10 positioned in a wall 11 thereof above the predetermined level 12 above which the top surface of the bulk supply of tubes 9 is not permitted to exceed. The discharge opening 10 is in alignment with the collector pipe 13. When the groove 7 is at its highest position 14 it is in alignment with the discharge opening 10 and the collector pipe 13 and so the row of tubes 9 collected in the groove 7 flow out of the discharge opening 10 into the collector pipe 13. When the plate 6 is in its lowest position 15 its groove 7 forms a deep groove 16 with the two sloping surfaces 5.

The driving gear for this embodiment of the invention comprises a common drive shaft 17 which carries a series of worms 18 each of which drives one set of operating gear. The worm 18 drives the worm wheel 19 the shaft 20 of which extends to both sides. Each end of the shaft 20 is provided with a crank 21. The rotation of the crank pins 22 is translated into vertical reciprocating motion of the bridles 23 through the medium of the forked connecting rods 24.

It is found that detonator tubes delivered by this machine are in no way damaged or scratched.

Referring to Figs. 4 and 5, 25 is a casing, 26 is a bulk supply of tubes, 27 is one complete unit and 27' is a unit showing a cut away portion. The unit 27 comprises a top receiving portion 28, the floor 29 of which slopes downwards to meet a vertical slot 30. 31 is a circular disc having apertures 32 cut out therein with grooves 33 on the advancing face of each of the apertures 32. The groove 33 is of a width 34 to permit only one row 35 of tubes 26 to lie therein. Each groove is so positioned once during the rotation of the disc 31 that it is at an angle to cause the row 35 of tubes collected therein to discharge eventually into the orifice 36 of the collector pipe 37. 38 is the lower terminal gap of the vertical slot 30. 39 is a curved deflector plate provided at the end of each groove 33 and is so set that when the groove 33 is in alignment with the orifice 36 the row of tubes 35 will slide downwards and be guided off the groove 33 into the orifice 36. 40 is the axle of the disc 31. 41 are the spokes of the disc 31.

Referring particularly to Fig. 5 the left hand unit shown therein shows the spoke 41 which is in the upper position carrying a row of tubes 35 in its groove 33. When this upper spoke 41 reaches the position shown in the right hand unit illustrated in Fig. 5 some of the bulk supply of tubes 26 are able to drop into the vertical slot 30 so as to fall into the groove 33 of the following spoke 41 shown in the position where it has entered and closed the lower terminal gap 38.

Detonator tubes delivered by this machine are found to be in no way damaged or scratched.

We claim:

1. A machine particularly adapted for delivering articles of relatively greater length than width and of a substantially straight longitudinal axis aligned one behind the other in the direction of their longitudinal axis consisting of a casing for receiving therein a bulk supply of said articles, said casing consisting of at least one unit, each unit comprising an article receiving means the floor of which slopes from one side downwardly at an angle to the horizontal and terminates in a downwardly extending vertical wall, a second wall parallel to said first vertical wall and spaced therefrom a distance not materially greater than the width of the articles to be delivered to provide said articles with a preliminary orientation, a disc adapted to rotate in a vertical plane with a minor portion thereof extending in the space between said walls and positioned with respect to the casing so that the terminating edge of the sloping floor of the casing is approximately on a line with the horizontal diameter of the disc, the thickness of said disc being substantially equal to the distance between said walls, and a plurality of substantially radially extending arms bounding recesses in said disc, said arms being spaced apart a distance such that when the rear extremity of one of the said arms clears the terminating edge of the sloping floor of the casing, the following arm is in a position closely approaching the horizontal, said recesses being of a depth and width not appreciably greater than the width of the articles to be received therein and being thereby adapted to receive articles and orient them during the upward passage of said recesses between said vertical walls and further being adapted to discharge said oriented articles by gravity into a receiving means which maintains said orientation.

2. A machine particularly adapted for delivering articles of relatively greater length than width and of a substantially straight longitudinally axis aligned one behind the other in the direction of their longitudinal axis as set forth in claim 1 wherein the discharge end of each groove is provided with a deflector guide adapted to direct the articles to the side of said disc member for delivering to said receiving means.

IAN F. STEWART.
DONALD G. ASHCROFT.

References Cited in the file of this patent

UNITED STATES PATENTS

| Number | Name | Date |
|---|---|---|
| 594,457 | Campbell | Nov. 30, 1897 |
| 611,604 | Campbell | Oct. 4, 1898 |
| 678,827 | Morris | July 16, 1901 |
| 1,536,833 | Fagan et al. | May 5, 1925 |
| 1,600,238 | McCain | Sept. 21, 1926 |
| 1,718,166 | McCain | June 8, 1929 |

FOREIGN PATENTS

| Number | Country | Date |
|---|---|---|
| 409,952 | France | Jan. 1, 1918 |